Patented Sept. 21, 1926.

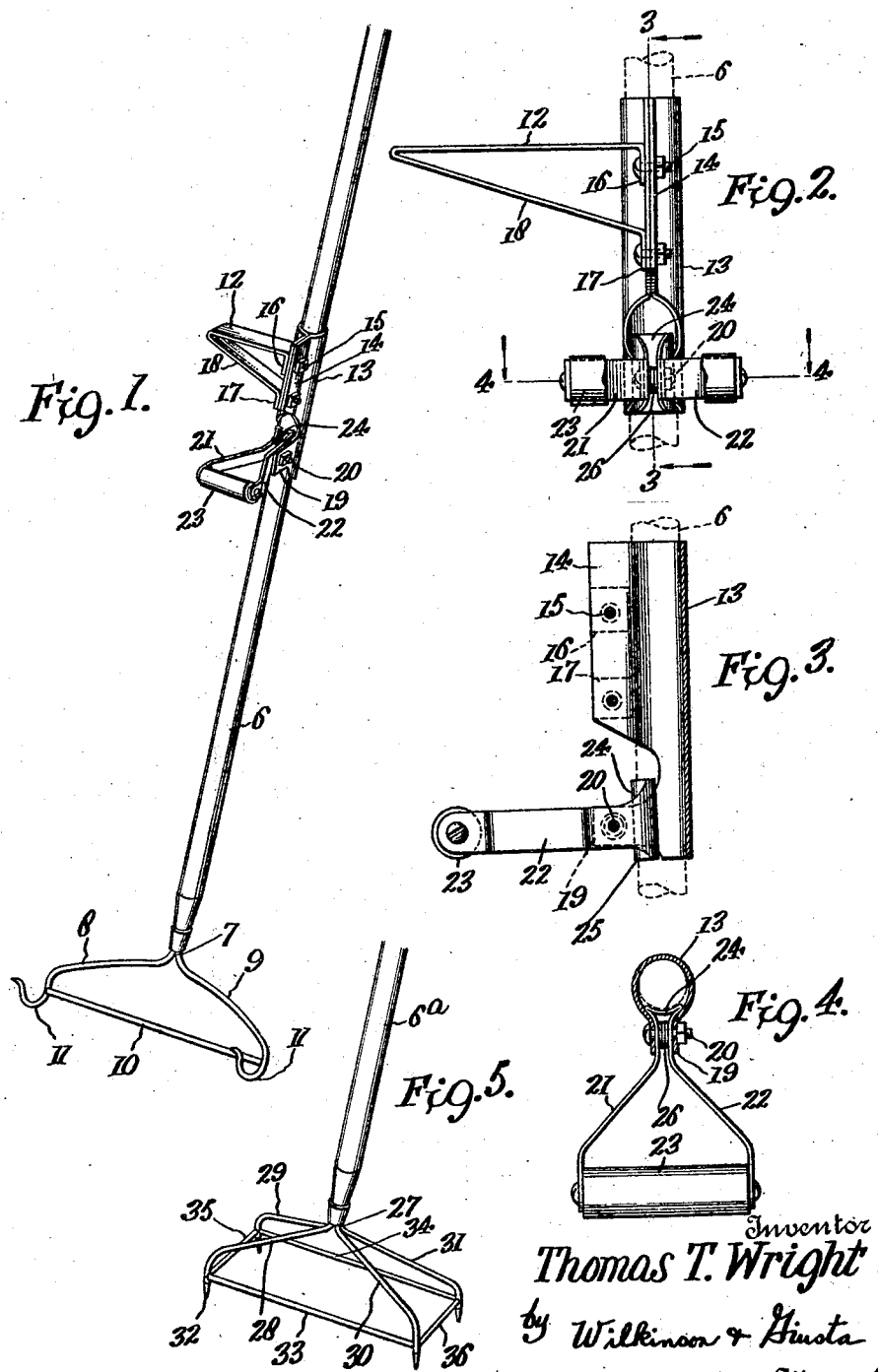

1,600,858

UNITED STATES PATENT OFFICE.

THOMAS T. WRIGHT, OF HOLTER DAM, MONTANA.

WEEDER.

Application filed May 1, 1925. Serial No. 27,236.

The present invention relates to improvements in weeding implements, and has for an object to provide an improved device adapted to penetrate the ground and to engage the roots and stems of the weeds without cutting the same, whereby on movement of the implement horizontally beneath the surface, such weeds will become entangled with the implement and withdrawn from the earth therewith.

It is also an object of my invention to provide an improved weeding frame and bar to facilitate penetration of these parts in the earth and their easy and convenient movement beneath the surface thereof in the act of dislodging the weeds and roots.

A further object of the invention resides in the provision of an implement which, unlike a hoe, will not remove the earth with the weeds, but which is designed to pass beneath the surface of the ground and to leave detached portions of the soil in the original position. This makes it unnecessary to leave huge holes and knobs, and renders it much easier to introduce and remove the implement from the ground.

The invention also contemplates the use of an improved handle and accessory device whereby the weight of the user may be imposed on the implement at various distances along the handle.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a perspective view showing an improved implement constructed in accordance with my invention.

Figure 2 is an enlarged front view of the handle accessory with parts broken away.

Figure 3 is a section taken on the line 3—3 in Figure 2.

Figure 4 is a cross section taken on the line 4—4 in Figure 2, and

Figure 5 is a fragmentary perspective view of a modified form of the invention.

Referring more particularly to the drawings, 6 designates the handle or pole of the device, and 7 designates a frame carried by one end thereof. The frame in this instance comprises the divergent arms 8 and 9, to the outer separated ends of which are attached the ends of the weeding bar 10. This bar is preferably thin and narrow, yet made of some strong material, preferably metal to resist bending and wear while passing beneath the surface of the ground. The outer ends of the frame members 8 and 9 project beyond the ends of the weeding bar 10 and are formed into substantially S-shaped prongs 11. These prongs extend upwardly and are given a forward pitch at their extremities. A very slight pressure downward is all that is necessary, and is secured by use of the hand to position the bar 10 in the ground. Then the weight of the body may be imposed upon the thrust receiving member 12 to force the weeding bar 10 forwardly through the soil with ease and little exertion on the part of the operator. The thrust receiving member 12 is carried by the sleeve 13, which is slidably mounted on the handle 6. The sleeve 13 is preferably made of sheet metal and is split longitudinally, having the meeting flanges 14 through which the bolts or other fastenings 15 are passed to secure the sleeve about the handle. The bolts 15 also pass through the right angular feet 16 and 17 of the thrust receiving member 12 and its diagonal base 18. The members 12 and 18 may be reversed to extend from the opposite side of the handle 6 by removing and replacing the bolts 15, and may with advantage be formed of a single piece of sheet metal doubled upon itself and arranged in substantially V-formation with the overturned feet or ends 16 and 17 provided with perforations to receive the bolts 15. The upstanding double flanges 15 reinforce the brace 18 and the member 12 and the elongated bearing of the sleeve 13 on the handle 6 contributes to spread the strain over a large area.

The sleeve is extended beyond the flanges 14 in the direction of the weeding implement, and such sleeve is provided with upstanding perforated ears 19 for the passage of the pivot bolt 20 on which the arms 21 and 22 forming the lever are fulcrumed. The outer ends of the arms 21 and 22 diverge for the purpose of receiving the hand grip 23. The lever is preferably formed of a bar of sheet metal folded upon itself with its end portions receiving the hand grip 23, and its intermediate portion bent into partially cylindrical form, conforming to the surface of the rounded handle 6 and forming the shoe or dog 24 adapted to bind at its forward end 25 or at its rear end when it is desired to draw the handle toward the operator, against the wood of the handle 6.

Spacing washers 26 are shown in Figure 4 as provided between the arms 21 and 22 of the lever.

Referring to Figure 5, the handle 6ª is shown as provided with a frame 27 having two pairs of arms 28, 29, 30 and 31 extending downwardly and outwardly and having prongs 32 on their free ends extending upwardly to prevent it from entering the ground too abruptly. The arms support a rectangular frame composed of the longitudinal weeding bars 33 and 34 and the end weeding bars 35 and 36. These bars are all arranged in one plane and are connected to the outer free ends of the arms 28, 29, 30 and 31.

In the use of the device, the sleeve 13 is adjusted along the handle 6 to suit the requirements of the individual user of the implement. For instance, tall and short men will work with better facility when the sleeve is at the outer or inner portions respectively of the handle. The sleeve is adjusted along the handle by grasping the hand grip 23 and drawing it toward the operator, who stands behind the thrust member 12. The shoe 24 is thus tilted into a position substantially parallel with the axis of the handle, and the sleeve may be slid along the handle in either direction to the desired position. When this position has been reached, the operator will thrust forwardly on the hand grip 23, causing the end 25 of the shoe to grip said handle 6. Pressure downward may thereupon be put upon the handle through the hand grip 23 and by engaging the hip of the user with the thrust member 12. Greater force and weight may consequently be imposed upon the weeding implement than is necessary to force it through the ground and disengage the weed. The weight of the operator imposed on the member 12 will cause the bar 10 to travel along beneath the surface of the ground. The operator steps forward keeping the pressure uniform. The bar 10 will engage the roots which will wrap about the same without cutting said roots and will draw them up through the surface when the bar 10 is lifted. The bar 10 moves along in a horizontal plane beneath the surface of the earth. After the bar has been moved a prescribed distance, it is lifted from the ground with a quick upward and forward flick and the device is in condition for reinserting. Movement of the grip handle 23 relieves weeder bar 10 and flips the weeds from the implement, eliminating the hand stripping of the weeds from the same and the taking of the hands from the handle and pole.

In the form of the invention shown in Figure 5, this device is particularly adapted for thinning sugar beets and also for removing the weeds therebetween. The length of the bars 33 and 34 will correspond preferably to the distance from one plant to another. When the bars 33 or 34 or 35 or 36 are below the surface the device may be moved along in either horizontal direction for a desired distance in order to thin out the beets and the weeds occurring in this distance. The thinner bars are constructed of the length desired to thin beets, and as the thinner bar, we will say is fourteen inches long, it will pass through a row and leave the beets fourteen inches apart as they are thickly sown. The thrust is made right close to the plant left at right end of the row where the thinner went through before and then a slight offset is made to miss one plant and a thrust is made between said row and the next advanced row, and so on until the work is completed.

It is obvious that various changes and modifications may be made in the details of construction and design of the above specifically described embodiment of this invention without departing from the spirit thereof, such changes and modifications being restricted only by the scope of the following claim.

What is claimed is:—

A weeding implement comprising a handle, a pair of divergent arms carried by the lower end thereof, a forwardly extending substantially U-shaped extension formed with the lower extremity of each arm and adapted to be forced into the ground, and a transverse weed engaging bar disposed between the arms and rigidly attached to the U-shaped extensions at points above the crest of the latter, the U-shaped extensions constituting ground penetrating members and runners.

THOMAS T. WRIGHT.